Jan. 30, 1923.   1,443,668
W. S. ADAMS.
CAR TRUCK.
FILED JULY 22, 1922.   2 SHEETS-SHEET 1

INVENTOR
Walter S. Adams
BY his ATTORNEY

Jan. 30, 1923.

W. S. ADAMS.
CAR TRUCK.
FILED JULY 22, 1922.

INVENTOR
Walter S. Adams
BY HIS ATTORNEY

Patented Jan. 30, 1923.

1,443,668

UNITED STATES PATENT OFFICE.

WALTER S. ADAMS, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

CAR TRUCK.

Application filed July 22, 1922. Serial No. 576,688.

*To all whom it may concern:*

Be it known that I, WALTER S. ADAMS, a citizen of the United States, and a resident of the city and county of Philadelphia and State of Pennsylvania, have invented a certain new and useful Improvement in Car Trucks, of which the following is a specification.

This invention relates to an improvement in car trucks, and particularly that form of truck used upon street cars of the lighter type; and has for its object to provide a spring system which will properly support the car body and which will be so arranged that it will act to prevent undesirable jerky side sway of the car body frequently found in the lighter types of cars and caused by inequalities in the rails.

A further object of this invention is to provide a car truck spring system adapted to accommodate the various stresses or loads imposed upon it in such a manner as to provide an easy riding car at all times.

With these objects, and other objects which may hereinafter appear, in view, I have devised the particular arrangement of parts hereafter set forth and more particularly pointed out in the claims appended hereto.

Reference is to be had to the accompanying drawings, forming part hereof, in which—

Throughout the various views of the drawings, similar reference characters designate similar parts.

Figure 1:
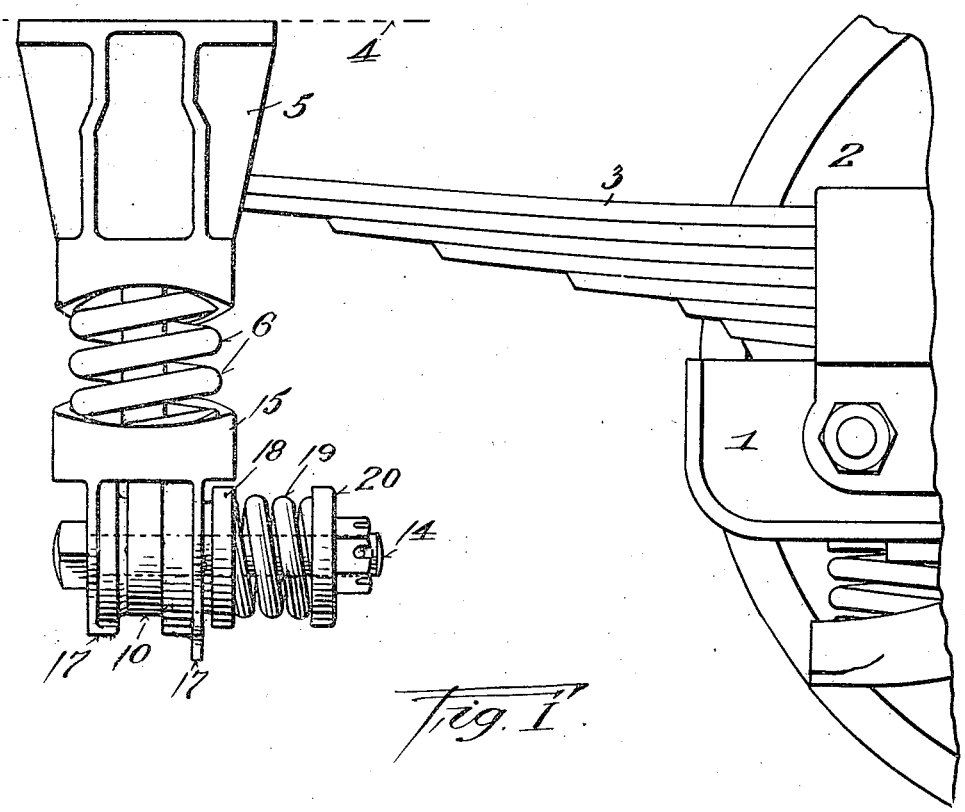
Figure 1 is a side elevation of a portion of a car truck, showing my improved spring arrangement.
Figure 2:
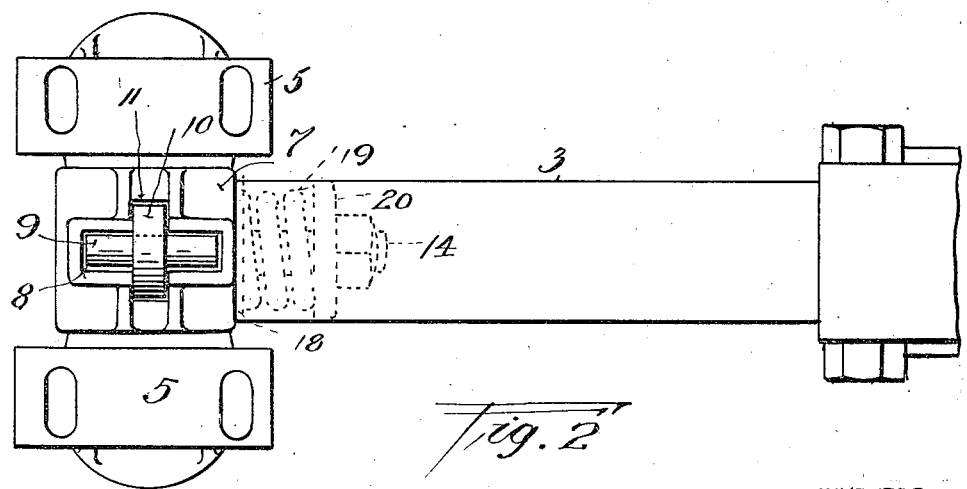
Figure 2 is a plan view of the same.
Figure 4:
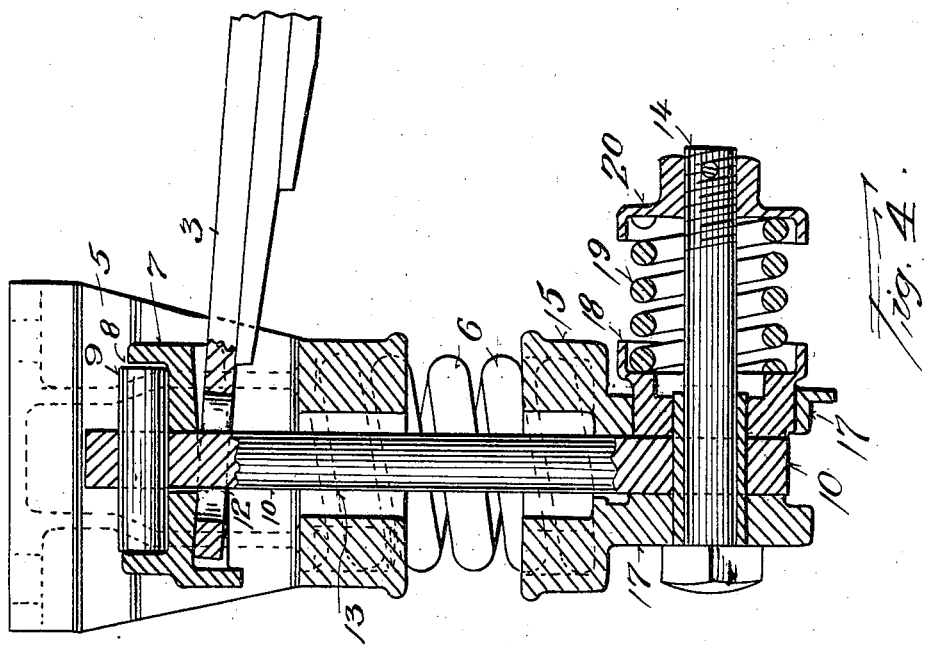
Figure 4 is a sectional view on the line 4—4 of Figure 3, looking in the direction of the arrows.
Figure 3:
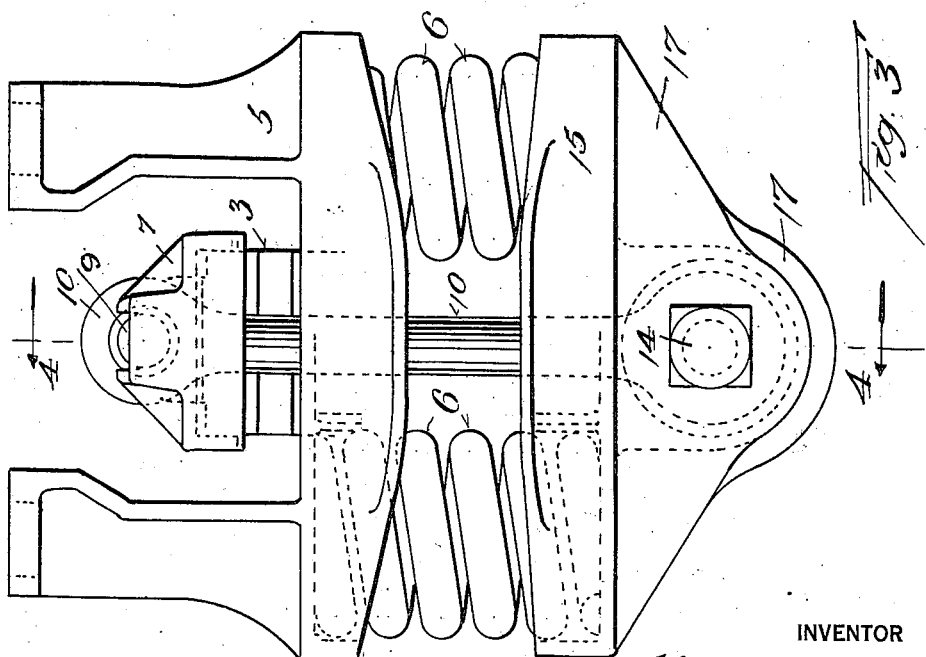
Figure 3 is an end view of the spring system.

In the preferred embodiment of my invention, as disclosed in the accompanying drawing, I have shown at 1 the end portion of a car truck frame in which are mounted the wheels 2 and which supports a longitudinally extending leaf spring 3 of the quarter elliptic type, having its end projecting beyond the frame. The dotted line 4 indicates the car body which is supported upon a bracket 5 resting upon a pair of spaced coil springs 6 carried in a manner hereinafter set forth.

The leaf spring 3 carries on its outer end a bearing 7 provided with a groove 8 in which a pin 9 is adapted to oscillate. This pin 9 passes through one end of a swinging link 10 which extends downwardly through an opening 11 in the bearing and through a corresponding opening 12 in the end of the leaf spring 3. The body bracket 5 is provided with a central opening 13 through which the link 10 extends downwardly, said opening being located between the two coil springs 6 whereby the link 10 is located intermediate of said coil springs.

Extending through the lower end of the link 10 is a pin 14 which carries a spring seat 15 adapted to support the spaced coil springs 6. This seat 15 is provided with a pair of downwardly extending ears 17 through which the pin 14 extends and between which the lower end of the link 10 is pivoted. A means for frictionally regulating the swinging movement of the link 10 is provided, which means consists of a friction-causing block 18 adapted to be forced against the lower end of the link 10 by means of a coil spring 19 surrounding the bolt or pin 14 and adapted to be compressed thereon as desired by means of the nut 20.

Through this arrangement the block 18 can be forced inwardly as desired so that it frictionally bears against the side of the link 10 at its lower end and frictionally resists swinging movement thereof as desired. The spaced apart coil springs afford a broad bearing surface for the support of the car body and aid in preventing distortion caused by sideward swing of the body.

The friction-causing means for regulating the swinging movement of the link 10 aids in preventing undesirable jerky lateral motion of the car body when uneven stretches of track are encountered.

From the foregoing it is obvious that my invention is not to be restricted to the exact embodiment shown, but is broad enough to cover all structures coming within the scope of the annexed claims.

What I claim is:—

1. A truck having a side frame, a leaf spring mounted thereon, a link depending from one end of said leaf spring, a spring seat on one end of said link, a pair of spaced coil springs on said seat, with the link located between said springs, a bracket resting on top of said coil springs and secured to the car body and means at the lower end of said link for frictionally resisting swinging movement of said link.

2. A truck having a frame, a leaf spring supported by said frame, a swing link depending from the outer end of said spring, a spring seat supported on the lower end of said link upon a pin extending through said link and spring seat, a plurality of coil springs resting upon said seat, means on the car body adapted to rest on said coil springs and means surrounding said pin for frictionally resisting swinging movement of said link.

3. A truck having a frame, a leaf spring mounted thereon, a bearing mounted on the end of said leaf spring, a link having one of its ends mounted to swing in said bearing, a spring seat carried on said link, a pair of coil springs carried on said spring seat on opposite side of said link, a car body supported on said coil springs and means co-operating with the spring seat for imposing a frictional resistance to swinging movement on said link.

4. A truck having a frame, a leaf spring mounted thereon, swinging means depending from said leaf spring, means on said swinging means for supporting a pair of coil springs, a car body supported on said coil springs and means for frictionally resisting swinging movement of said swinging means.

5. A truck having a frame, a leaf spring mounted thereon, means mounted to swing from one end of said leaf spring, means on said swinging means for supporting a pair of coil springs between which said swinging means extends, and means co-operating with said spring-supporting means for frictionally resisting swinging movement of said swinging means.

6. A truck having a frame, a leaf spring supported thereon, a spring seat located below one end of said spring, a pair of spaced-apart coil springs carried on said seat, a link mounted to swing from the end of said leaf spring and extending between the coil springs and carrying the spring seat and means co-operating with the spring seat for imposing resistance to swinging movement on said link.

7. A truck having a frame, a leaf spring supported thereon, a spring seat located below one end of said frame, a pair of coil springs carried by said seat, a swinging link carried on the end of the leaf spring and extending downward therefrom and pivotally secured to the spring seat, said link extending intermediate of the coil springs, a pair of ears on said spring seat, a pin or bolt extending therethrough, a spring surrounding said pin or bolt, and a friction-exerting member adapted to be thrust against the link by said spring.

8. A truck having a frame, a leaf spring supported thereon, said leaf spring having an opening adjacent its outer end, a bearing on said spring, a swinging link mounted in said bearing and extending downward through the opening in the spring, a pin carried by the lower end of said link, a spring seat carried on said pin, a plurality of coil springs supported on said seat, means carried by the car body adapted to rest on said springs, and means for frictionally resisting swinging movement of the link, said means comprising a spring surrounding the seat-supporting pin, means for regulating the tension of said spring and means adapted to frictionally bear against said link by pressure of said spring.

Signed at the city and county of Philadelphia and State of Pennsylvania, this 1st day of July, 1922.

WALTER S. ADAMS.